United States Patent

Barnes et al.

[15] 3,669,993

[45] June 13, 1972

[54] HIGH TEMPERATURE BIS(EPOXYALKYL) CARBORANE ADHESIVES

[72] Inventors: Robert L. Barnes, Clifton; Daniel Grafstein, Morristown, both of N.J.

[73] Assignee: The Singer Company, New York, N.Y.

[22] Filed: Sept. 25, 1968

[21] Appl. No.: 762,614

[52] U.S. Cl.....................260/348 R, 260/606.5 B, 260/2 N, 156/325
[51] Int. Cl................................C07d 109/02, C07d 107/02
[58] Field of Search....................................260/606.5 B, 348

[56] References Cited

UNITED STATES PATENTS 3,247,257  4/1966  Green et al. ........................260/606.5
3,254,096  5/1966  Dupont et al. ..........................260/348
3,360,569  12/1967  Grafstein et al.....................260/348 X

*Primary Examiner*—Norma S. Milestone
*Attorney*—S. A. Giarratana, G. B. Oujevolk and S. M. Bender

[57] ABSTRACT

The process of providing an adhesive junction between two workpieces having opposing smooth surfaces comprising the steps of mixing material selected from the group consisting of bis(epoxybutyl)carborane, bis(epoxypentyl)carborane, and bis(epoxyhexyl)carborane, with a curing agent selected from the group consisting of boron trifluoride ethylamine and 4,4'-diaminodiphenylsulfone, applying said mixture to the opposing surfaces, joining the surfaces and allowing the workpieces with the mixture therebetween to harden under heat and pressure.

6 Claims, No Drawings

HIGH TEMPERATURE BIS(EPOXYALKYL) CARBORANE ADHESIVES

The invention described herein was made in the performance of work under a NASA contract and is subject to the provisions of Section 305 of the National Aeronautics and Space Act of 1958, Public Law 85-568 (72 Stat. 435; 42 U.S.C. 2457).

The present invention relates to the preparation of bis(epoxyalkyl)carborane monomers, alkenyl intermediates leading to these monomers, and formulations based on these monomers which are useful for room temperature and high-temperature adhesive application.

Generally speaking, bisalkenylcarborane intermediates which are the subject of the present invention having the following structure

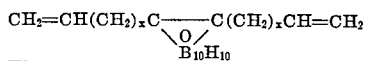

These are:
(a) $x=1$; 1,2-bis(2-propenyl)carborane
(b) $x=2$; 1,2-bis(3-butenyl)carborane
(c) $x=3$; 1,2-bis(4-pentenyl)carborane
(d) $x=4$; 1,2-bis(5-hexenyl)carborane
(e) the isomeric compound 1,7-bis(3-butenyl)-neo-carborane.

These compounds can be converted to the corresponding terminal epoxy derivatives having the following structure

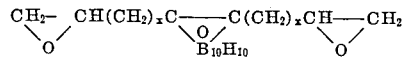

The following compounds are also characterized herein:
(a) $x=1$; 1,2-bis(epoxypropyl)carborane
(b) $x=2$; 1,2-bis(epoxybutyl)carborane
(c) $x=3$; 1,2-bis(epoxypentyl)carborane
(d) $x=4$; 1,2-bis(epoxyhexyl)carborane
(e) the isomeric compound 1,7-bis(epoxybutyl)-neo-carborane.

These epoxies can be cured to hard solids by catalysts and/or reactive hardeners to form a polymer having the following repeating unit in its general structure.

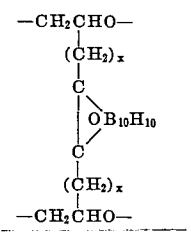

It is also to be observed that polymers from monoepoxyalkylcarboranes have been investigated and displayed no adhesive properties. These monoepoxyalkylcarboranes have the following repeating structural formula.

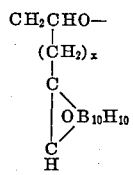

The synthesis of carborane $C_2B_{10}H_{12}$ which is the base material for the present invention has been described in a series of articles appearing in the 1963 December issue of "Inorganic Chemistry."

Carborane can be converted to a series of bis(alkenyl)-carboranes using a dilithium derivative in accordance with the following reactions:

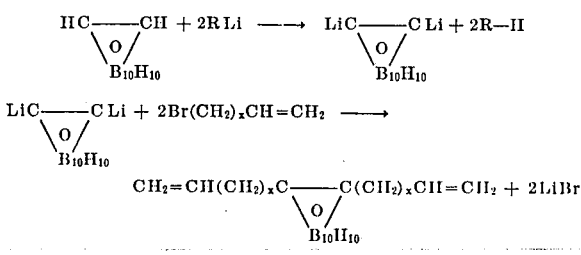

Bisalkenylcarboranes where $x=1,2,3$, and 4 were prepared in this way. In addition, the bisbutenyl-derivative ($x=2$) of meta(neo)carborane was also prepared. The following illustrative examples are given with regard to the preparation of these compounds.

EXAMPLE 1

1,2-Bis(3-butenyl)carborane: $x=2$

A slight excess of 1.6M butyllithium solution in hexane (135 ml or 0.216 moles of BuLi) was transferred to a dropping funnel in a nitrogen-filled glove bag. The solution was added over a 15-minute period, with stirring, to 11.5g (0.0800 moles) of carborane dissolved in 75 ml of anhydrous ethyl ether contained in a round bottom reaction flask. During addition, a nitrogen flow was maintained over the system, and the flask was cooled with an ice-water bath. After addition was complete, the suspension of heavy white solid was stirred at room temperature for one hour. The suspension was allowed to settle, and the bulk of the supernatant liquid was removed with a syringe. About 75 ml of anhydrous ethyl ether was added to the system with stirring to wash the solid. The bulk of the solution was removed, and the procedure was repeated. About 100 ml of anhydrous ethyl ether was added, and the mixture was heated to reflux. A weighed quantity of 4-bromo-1-butene (27.0g — 0.200 moles) was added to the system over a 10-minute period. After a two-hour reflux period, the reaction mixture was poured into 200 ml of water and thoroughly mixed. The ether layer was separated and dried with magnesium sulphate. The crude product, obtained from the removal of the ether solvent on a rotary evaporator, was fractionally distilled under vacuum (0.1 mm) and the fraction which evolved at a head temperature of 150°-170° C was collected and crystallized. The colorless solid (14.3g representing a 76 percent conversion of carborane to desired product) had a m.p. range of 70°-72° C. Gas chromatographic and infrared analyses indicated that the sample was 98 percent pure and an elemental analysis was in excellent agreement with the expected values.

Calcd. for $B_{10}C_{10}H_{24}$: B,42.8;C,47.7;H,9.5
Found: B,42.4;C,48.2;H,9.5

EXAMPLE 2

1,2-Bis(4-pentenyl)carborane: $x=3$

The procedure described above for the preparation of bis(butenyl)carborane was followed using the following amounts of reagents.

125 ml butyllithium solution (0.200 moles of BuLi)
11.5g carborane (0.0800 moles)
27.0g 5-bromo-1-pentene (0.180 moles)

The crude product was distilled under vacuum (0.1 mm) and the fraction which evolved at a head temperature of 150° C was collected as a colorless liquid (18g representing a conversion of 72 percent carborane to desired product). Gas chromatographic and infrared analyses indicated that the product was 93 percent pure.

EXAMPLE 3

1,2-Bis(5-hexenyl)carborane: $x=4$

The procedure described above for the preparation of bis(butenyl)carborane was followed using the following amounts of reagents.

150 ml butyllithium solution (0.240 moles of BuLi)
14.4g carborane (0.100 moles)
32g 6-bromo-1-hexane (0.20 moles)

The crude product was distilled under vacuum (0.1 mm) and the fraction which evolved at a head temperature of 180° C was collected (26.8g of colorless liquid representing a conversion of 87 percent carborane to desired product). Gas chromatographic and infrared analyses indicated that the product was 96 percent pure.

EXAMPLE 4

1,2-Bis(2-propenyl)carborane: $x=1$

The procedure described above for the preparation of bis(butenyl)carborane was followed except that a longer reflux time (24 hours) was employed. The following amounts of reagents were used.

150 ml butyllithium solution (0.240 moles BuLi)
14.4 g carborane (0.100 moles)
29g allylbromide (0.24 moles)

The crude product was distilled under vacuum (0.1 mm) and the product which evolved at a head temperature of 150° C was collected (40 g of a colorless liquid representing a conversion of 18 percent carborane to desired product. Gas chromatographic and infrared analyses indicated that the sample was 93 percent pure.

EXAMPLE 5

1,7-Bis(3butenyl)-neo-carborane: $x=2$

The procedure described above for the preparation of bis(butenyl)carborane was followed except that the intermediate step involving purification of dilithio-neo-carborane was omitted. The following amounts of reagents were used.

50 ml butyllithium solution (0.800 moles of BuLi)
5.8g carborane (0.040 moles)
10.8g 4-bromo-1-butene (0.795 moles)

The crude product was distilled under vacuum (0.1 mm) and the fraction which evolved at a head temperature of 150° C was collected (6.2 g of a colorless liquid representing 60 percent conversion of carborane to desired product). Gas chromatographic and infrared analyses indicated that the product was 93 percent pure.

Bis(alkenyl)carboranes could be converted to the corresponding terminal bis(epoxyalkyl)carborane monomers by treatment with trifluoroperacetic acid under carefully controlled buffer conditions in the following manner $$CH_2=CH(CH_2)_xC\underset{\underset{B_{10}H_{10}}{}}{\overset{}{\diagdown_O\diagup}}C(CH_2)_xCH=CH_2 + 2CF_3CO_3H \xrightarrow[Na_2CO_3]{CH_2Cl_2}$$

$$CH_2\underset{O}{\diagdown\diagup}CH(CH_2)_xC\underset{\underset{B_{10}H_{10}}{}}{\overset{}{\diagdown_O\diagup}}C(CH_2)_xCH\underset{O}{\diagdown\diagup}CH_2 + 2CF_3CO_2H$$

Bis(epoxyalkyl)carboranes where $x=1,2,3$, and 4 were prepared in this way. In addition, the bis(epoxybutyl) derivative ($x=2$) of meta (neo) carborane was prepared. This is the first reported preparation of these compounds.

EXAMPLE 6

1,2-Bis(epoxybutyl)carborane: $x=2$

Trifluoroperacetic acid was prepared in the following manner. Sixty ml of methylene chloride was added to 4.4 ml (0.16 moles) of 90 percent hydrogen peroxide at 0° C. A total of 22.8 ml (0.160 moles) of trifluoroacetic anhydride was added to the above solution with stirring over a ten-minute period. Stirring was continued for another 10 minutes. A mixture of 100 ml of methylene chloride, 36g of sodium carbonate and 13.2g (0.0520 moles) of bisbutenylcarborane was placed in a three-necked round bottom flask. The flask was equipped with a mechanical stirrer, reflux condenser and a dropping funnel. The solution of trifluoroperacetic acid was added dropwise over a 90-minute period. During this time, the temperature of the reaction was maintained below reflux by the use of an ice-water bath. After the addition was complete, the mixture was refluxed for 30 minutes. Following the reflux period, reaction of a drop of the supernatant liquid to starch-iodide paper was negative, indicating the absence of peroxides. Gravity filtration of the reaction mixture followed by removal of solvent from the filtrate on a rotary evaporator gave 4.1g of a white solid. The sample was distilled under vacuum and the fraction which evolved at a head temperature of 200° C was collected and crystallized. The colorless solid(10g representing a 67 percent conversion of alkenylcarborane to desired product) had a melting point range of 68–71°C. Gas chromatographic and infrared analyses indicated that the sample was better than 95 percent pure and an elemental analysis was in excellent agreement with the calculated values.

Calcd. for $B_{10}C_{10}H_{24}O_2$: B,38.0:C,42.3;H,8.5
Found: B,38.6:C,42.5;H,8.6

EXAMPLE 7

1,2-Bis(epoxypentyl)carborane: $x=3$

The procedure used for the preparation of bis(epoxybutyl)-carborane was followed using the following amounts of reagents.

2.2 ml 90 percent Hydrogen Peroxide (0.080 moles)
11.4 ml Trifluoroacetic Anhydride (0.080 moles)
6.5g 1,2-Bis(4-pentenyl)carborane (0.021 moles)

The crude product was distilled under vacuum (0.1 mm) and the fraction which evolved at a head temperature of 200°C was collected and crystallized. The colorless solid (5g representing a 68 percent conversion of carborane to desired product) had a melting point range of 68°–75° C. Gas chromatographic and infrared analyses indicated a purity of 95 percent and an elemental analysis was in excellent agreement with the theoretical values.

Calcd. for $B_{10}C_{12}H_{28}O_2$:B,34.6;C,46.2;H,9.0
Found: B,33.3;C,45.3;H,9.1

EXAMPLE 8

1,2-Bis(epoxyhexyl)carborane: $x=4$

The procedure used for the preparation of bis(epoxybutyl)-carborane was followed using the following amounts of reagents.

4.4 ml of 90 percent Hydrogen Peroxide (0.16 moles)
22.8 ml of Trifluoroacetic Anhydride (0.160 moles)
13.6g. of 1,2-Bis(5-hexenyl)carborane) (0.043 moles)

The crude product was distilled under vacuum (0.1 mm) and the fraction (10.5g representing a conversion of 73 percent of alkenylcarborane to desired product) which evolved at a head temperature of 225° C was collected. Gas chromatographic and infrared analyses of the colorless liquid indicated a purity of 97 percent. An elemental analysis was in excellent agreement with the calculated values.

Calcd. for $B_{10}C_{14}H_{32}O_2$: B,32.8; C,49.5; H,9.4
Found: B,31.3;C,48.2;H,9.4

EXAMPLE 9

1,2-Bis(epoxypropyl)carborane: $x=1$

The procedure used for the preparation of bis(epoxybutyl)-carborane was followed except that disodium hydrogen phosphate was used as the buffer in place of sodium carbonate. The following amount of reagents were used:

2.2 ml of Hydrogen Peroxide (0.080 moles)
11.4 ml of Trifluoroacetic Anhydride (0.080 moles)
3.5g of 1,2-Bis(2-propenyl)carborane (0.016 moles)

A total of 3.0g of product (representing an 83 percent conversion of alkenylcarborane to desired product) was isolated. Gas chromatographic and infrared analyses of the solid (melting point 36°–48° C) indicated a purity of 97 percent.

EXAMPLE 10

1,7-Bis(epoxybutyl)-neo-carborane: $x=2$

The procedure used for the preparation of bis(epoxybutyl)-carborane was followed using the following amounts of reagents.

2.2 ml of 90 percent Hydrogen Peroxide (0.080 moles)
11.4 ml of Trifluoroacetic Anhydride (0.080 moles)
6.6g of 1,7-Bis(butyl)-neo-carborane (0.026 moles)

The crude product was distilled under vacuum (0.1 mm) and the fraction evolved at a head temperature of 150°–170° C was collected and crystallized. The colorless solid (4.5g representing a conversion of 68 percent of alkenyl-neo-carborane to desired product) had a melting point range of 51°–54° C. Gas chromatographic and infrared analyses of the product indicated a purity of 94 percent.

Adhesive Properties

Excellent steel-on-steel adhesive strength is obtained when bis(epoxyalkyl)carboranes are cured with catalytic agents or reactive hardeners at temperatures above 100° C under moderate pressure. Representative lap-shear strengths at room temperature are listed below for the epoxies cured with the catalyst, boron trifluoride:monethylamine.

| Epoxy | Example Number | Lap-Shear Strength, psi |
|---|---|---|
| Bis(epoxybutyl)carborane | 12 | 2320 |
| Bis(epoxypentyl)carborane | 13 | 2810 |
| Bis(epoxyhexyl)carborane | 14 | 3600 |

Representative lap-shear strengths at room temperature are listed below for the epoxies cured with the reactive hardener 4,4'-diaminodiphenylsulfone.

| Epoxy | Example Number | Lap-Shear Strength, psi |
|---|---|---|
| Bis(epoxypropyl)carborane | 15 | 1740 |
| Bis(epoxybutyl)carborane | 16 | 2040 |
| Bis(epoxybutyl)-neo-carborane | 17 | 2000 |

Lap-shear strengths at 400° C (air atmospheres-10 minute hold at temperature) as high as 980 psi have been obtained with the bis(epoxybutyl)carborane-3phrBF$_3$:EtNH$_2$ catalyst system — Example 18.

Superior high temperature results are obtained by reacting the bis(epoxyalkyl)carboranes with certain reactive hardeners. Lap-shear strengths as high as 1,730 psi have been obtained at 500° F in air when bis(epoxybutyl)carborane was cured with 4,4'-diaminodiphenylsulfone (Example Number 19). These values, which represent 80 percent retention of room temperature strength (2,040 psi) were obtained on samples which had been previously "soaked" at 500° F for 2 hours. Lap-shear strengths as high as 1,460 psi at 500° F in air have been obtained on samples soaked at 500° F for 24 hours (Example Number 20). At 440° F, 100 percent of room-temperature lap-shear strength is retained (Example Number 21).

The following examples relate to preparation of lap-shear test specimens, testing procedures, formulations for the various adhesive compositions and test results.

EXAMPLE 11

Preparation of Lap-shear Specimens and Testing Procedures

Stainless steel strips (17-7) were cut to dimensions called for in Mil Spec MIL-A-005090E (Wep) for lap-shear specimens (5.094 in. × 1.00 in. × 0.050 in.). All the edges were de-burred. The strips were first degreased in methylethylketone prior to a ten-minute immersion in an acid solution at room temperature. This acid solution had the following composition.

| | |
|---|---|
| Nitric Acid (70%) | 10% |
| Hydrofluoric Acid (50%) | 2% |
| Water | 88% |

On removal from the acid solution, the adherends were thoroughly rinsed with cold water and then immersed in a chromic acid solution for 10 minutes at 160° F. The composition of the acid solution was as follows:

| | |
|---|---|
| Sodium Dichromate | 28.5g |
| Sulphuric Acid | 285g |
| Tap Water | To make 1 liter |
| Aluminum Metal | 5g |

After the acid treatment, the adherends were thoroughly rinsed in cold running tap water. Finally, they were rinsed in distilled water, observed to make sure they held a continuous film of water, and dried in an oven for 30 minutes at 160° F. After the degreasing step, all handling was done using cotton gloves.

The adherends were laid up in a special mounting fixture which ensured accurate alignment of the adherends and an exact overlap of 0.50 in. The fixture could take a total of five specimens (ten adherends). The B-staged epoxy was warmed (212°–00° F — depending on the test sample) are carefully applied to the adherends. The latter were then warmed with an air gun and the liquid was spread over the overlap surfaces. In some cases, the fixture was placed in a vacuum oven at 212° F for 15–20 minutes to outgas dissolved air in the epoxy. A 0.5 inch wide strip of glass cloth (Volan A–181 or 112) was laid over the overlap area of the lower adherend, and the upper adherend was then placed over the glass cloth. The lay-up fixture containing the specimens was placed in a Carver Hydraulic Press equipped with heating plates and a modified quick closer attachment to ensure constant pressure. After curing, the specimens were removed from the mounting fixture and filed to remove excess epoxy. The glue line thickness in each specimen was determined by measuring the thickness of each adherend adjacent to the overlap area with a micrometer, followed by measuring the total thickness at the overlap area. A simple subtraction gave the glue line thickness. All specimens were tested in an Instron Tensile Tester at a constant strain rate of 0.01 in./in./min. In elevated temperature tests, a specially designed furnace was preheated and placed around the specimen in the Instron Tensile Machine. A period of 15 to 20 minutes was required to bring the specimens to the test temperature. The specimen was held at that temperature for ten minutes and tested (at temperature).

EXAMPLE 12

Lap-shear Strength

Bis(epoxybutyl)carborane-3phrBF$_3$:EtNH$_2$

| Test Temperature °F | Glue Line Thickness (in.) | Failure Strength psi |
|---|---|---|
| 75 | 0.003 | 2320 |

Composition—1.86 g epoxy + 0.06g catalyst
B-stage—230-265°F for 50 minutes
Outgassed—No
Glass Cloth—Style 181
Cure-Assembly—445° F, 120 psi, 1 hour
Post-Cure—None

EXAMPLE 13

Lap-shear Strength

Bis(epoxypentyl)carborane-3phrBF$_3$:EtNH$_2$

| Test Temperature °F | Glue Line Thickness (in.) | Failure Strength psi |
|---|---|---|
| 75 | 0.006 | 2810 |

Composition—1.0g epoxy + 0.030g catalyst
B-stage—225–260°F for 30 minutes
Outgassed—No
Glass Cloth—Style 181
Cure-Assembly—445° F, 120 psi, 1 hour
Post-Cure—None

EXAMPLE 14

Lap-shear Strength

Bis(epoxyhexyl)carborane-3phrBF$_3$:EtNH$_2$

| Test Temperature °F | Glue Line Thickness (in.) | Failure Strength psi |
|---|---|---|
| 75 | 0.007 | 3600 |

Composition—1.02g epoxy + 0.03g catalyst
B-stage—230–265° F for 30 minutes
Outgassed—No
Glass Cloth—Style 181
Cure-Assembly—445° F, 120 psi, 1 hour
Post-cure—None

EXAMPLE 15

Lap-shear Strength

Bis(epoxypropyl)carborane-48phr 4,4'-diaminodiphenylsulfone

| Test Temperature °F | Glue Line Thickness (in.) | Failure Strength psi |
|---|---|---|
| 75 | 0.003 | 1740 |

Composition—1.52g epoxy + 0.73g hardener
B-stage—300° F for 40 minutes
Outgassed—Yes
Glass Cloth—Style 112
Cure-Assembly—390° F, 120 psi, 2½ hours

EXAMPLE 16

Lap-shear Strength

Bis(epoxybutyl)carborane-47phr 4,4'-diaminodiphenylsulfone

| Test Temperature °F | Glue Line Thickness (in.) | Failure Strength psi |
|---|---|---|
| 75 | 0.005 | 2040 |

Composition—1.51g epoxy + 0.71g hardener
B-stage—300° F for 40 minutes
Outgassed—Yes
Glass Cloth—Style 112
Cure-Assembly—390° F, 120 psi, 2½ hours
Post-Cure—None

EXAMPLE 17

Lap-shear Strength

Bis(epoxybutyl)-neo-carborane-28 phr 4,4'-diaminodiphenylsulfone

| Test Temperature °F | Glue Line Thickness (in.) | Failure Strength psi |
|---|---|---|
| 75 | 0.004 | 2000 |

Composition—2.02g epoxy + 0.56g hardener
B-stage—300° F for 2¼ hours. Specimens 1–10
Specimens 11-15 received an additional 3 hours post-cure at 300° F
Outgassed—Yes
Glass Cloth—Style 181
Cure-Assembly—445° F, 120 psi, 2 hours

EXAMPLE 18

Lap-shear Strength

Bis(epoxybutyl)carborane-3phrBF$_3$:EtNH$_2$

| Test Temperature °F | Glue Line Thickness (in.) | Failure Strength psi |
|---|---|---|
| 400 | 0.007 | 980 |

Composition—2.01g epoxy + 0.06g catalyst
B-stage—212° F for 1 hour
Outgassed—Yes
Glass Cloth—None
Cure-Assembly—445° F, 120 psi, 1 hour
Post-Cure—None

EXAMPLE 19

Lap-shear Strength

Bis(epoxybutyl)carborane-47phr 4,4'-diaminodiphenylsulfone

| Test Temperature °F | Glue Line Thickness (in.) | Failure Strength psi |
|---|---|---|
| 500 | 0.006 | 1730 |

Composition—1.51g epoxy + 0.71g hardener
B-state—300° F for 40 minutes
Outgassed—Yes
Glass Cloth—Style 112
Cure-Assembly—390° F, 120 psi, 2½ hours
Post-Cure—500° F for 2 hours

EXAMPLE 20

Lap-shear Strength

Bis(epoxybutyl)carborane-48phr 4,4'-diaminodiphenylsulfone

| Test Temperature °F | Glue Line Thickness (in.) | Failure Strength psi |
|---|---|---|
| 500 | 0.004 | 1460 |

Composition—1.51g epoxy + 0.73g hardener
B-state—300° F. for 45 minutes
Outgassed—Yes
Glass Cloth—Style 112
Cure-Assembly—390° F, 120 psi, 2 hours
Post-Cure—24 hours at 500° F

EXAMPLE 21:

Lap-shear Strength

Bis(epoxybutyl)carborane-30phr 4,4'-diaminodiphenylsulfone

| Test Temperature °F | Glue Line Thickness (in.) | Failure Strength psi |
|---|---|---|
| 400 | 0.004 | 1880 |

Composition—2.02g epoxy + 0.60g hardener
B-stage—226–302° F for 60 minutes followed by 300° F for 75 minutes
Outgassed—Yes
Glass Cloth—Style 181
Cure Assembly—445° F, 120 psi, 2 hours
Post-Cure—None

We claim:
1. 1,2-Bis(epoxyalkyl)carborane of the following structure

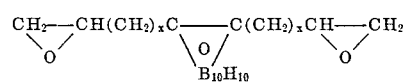
where $x = 1, 2, 3,$ and $4$
2. 1,2-Bis 2,3epoxypropyl) carborane.
3. 1,2-Bis (3,4epoxybutyl) carborane.
4. 1,2-Bis (4,5epoxypentyl carborane.
5. 1,2-Bis (5,6epoxyhexyl) carborane.
6. 1,7-Bis (3,4epoxybutyl)-neo-carborane.
* * * * *